United States Patent
Miyake et al.

(10) Patent No.: US 11,066,114 B2
(45) Date of Patent: Jul. 20, 2021

(54) METHOD FOR MANUFACTURING AUTOMOBILE AND COMPRESSION HOLDING JIG

(71) Applicant: TOYOTA JIDOSHA KABUSHIKI KAISHA, Toyota (JP)

(72) Inventors: Hirota Miyake, Toyota (JP); Yuji Nabeshima, Ama (JP); Nobuyuki Nagai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 16/426,583

(22) Filed: May 30, 2019

(65) Prior Publication Data
US 2020/0010132 A1    Jan. 9, 2020

(30) Foreign Application Priority Data

Jul. 4, 2018    (JP) .............................. JP2018-127687

(51) Int. Cl.
| | | |
|---|---|---|
| *B62D 65/02* | (2006.01) | |
| *B62D 65/04* | (2006.01) | |
| *B62D 65/12* | (2006.01) | |
| *B25J 9/16* | (2006.01) | |

(52) U.S. Cl.
CPC .......... *B62D 65/026* (2013.01); *B25J 9/1687* (2013.01); *B62D 65/022* (2013.01); *B62D 65/04* (2013.01); *B62D 65/12* (2013.01)

(58) Field of Classification Search
CPC .... B62D 65/026; B62D 65/022; B62D 65/04; B62D 65/12; B62D 65/024; B62D 65/00; B25J 9/1687
See application file for complete search history.

(56) References Cited

U.S. PATENT DOCUMENTS

| | | | |
|---|---|---|---|
| 5,319,840 A | 6/1994 | Yamamoto et al. | |
| 9,132,872 B2 * | 9/2015 | Doll ..................... | B62D 65/022 |
| 9,308,955 B2 | 4/2016 | Jones | |
| 9,776,286 B2 * | 10/2017 | Tanaka .................. | B23K 31/02 |
| 10,640,297 B2 * | 5/2020 | Kilibarda ............... | B65G 35/06 |

FOREIGN PATENT DOCUMENTS

| | | |
|---|---|---|
| EP | 1593461 A1 | 11/2005 |
| GB | 2 192 594 A | 1/1988 |
| JP | 05-124547 A | 5/1993 |
| JP | 11-245863 A | 9/1999 |
| JP | 2002-211458 A | 7/2002 |
| JP | 2002284057 A | 10/2002 |
| JP | 2007-69762 A | 3/2007 |
| JP | 2014080157 A | 5/2014 |
| JP | 2016175168 A | 10/2016 |

* cited by examiner

*Primary Examiner* — John C Hong
(74) *Attorney, Agent, or Firm* — Sughrue Mion, PLLC

(57) ABSTRACT

A method for manufacturing an automobile includes placing a body on a pre-assembled underside part set, and then assembling the underside part set onto the body. The underside part set includes a rear suspension in which a spring and a shock absorber are arranged side by side, and the spring is brought into a compressed state in the underside part set before the body is placed on the underside part set.

7 Claims, 7 Drawing Sheets

METHOD FOR MANUFACTURING AUTOMOBILE AND COMPRESSION HOLDING JIG

CROSS REFERENCE TO RELATED APPLICATIONS

This application is based upon and claims the benefit of priority from Japanese patent application No. 2018-127687, filed on Jul. 4, 2018, the disclosure of which is incorporated herein in its entirety by reference.

BACKGROUND

The present disclosure relates to a method for manufacturing an automobile and a compression holding jig.

In general, in an automotive assembling line, while a painted body of an automobile is being conveyed in a lifted state (e.g., while being suspended), an engine, suspensions, and other parts to be attached on the underside of the body (hereinafter also referred to as underside parts) are assembled (i.e., attached) onto the body one after another from the underside of the body.

Meanwhile, in a method for manufacturing an automobile disclosed in Japanese Unexamined Patent Application Publication No. H5-124547, a body of an automobile is placed on a pre-assembled set of underside parts (i.e., a set of underside parts that have already been assembled into one part unit) and then the set of underside parts (hereinafter also referred to as the underside part set) is assembled onto the body. It is possible to assemble (e.g., attach) a plurality of underside parts onto the body all at once and thereby to reduce the assembling time.

SUMMARY

The inventors have found the following problem in the method for manufacturing an automobile, in which a body is placed on a pre-assembled underside part set and the underside part set is assembled onto the body.

In a rear suspension disclosed in FIG. 13 of Japanese Unexamined Patent Application Publication No. H5-124547, a shock absorber and a spring are integrated with each other by inserting the shock absorber into the spring.

Meanwhile, recently, a rear suspension in which a spring and a shock absorber are separately arranged side by side has begun to be widely adopted.

When an underside part set including such a rear suspension is assembled onto a body, it is necessary to compress a spring by pressing the body onto the underside part set by using, for example, a body transport apparatus. As an example, the force for compressing the spring is about 10 kN. As a result, there is a problem that the size of the manufacturing apparatus such as the body transport apparatus increases.

It should be noted that in a rear suspension like the one disclosed in Japanese Unexamined Patent Application Publication No. H5-124547, in which the spring and the shock absorber are integrated with each other, it is unnecessary to compress the spring when the rear suspension is assembled onto the body.

The present disclosure has been made in view of the above-described circumstances and an object thereof is to provide a method for manufacturing an automobile, capable of preventing or reducing an increase in size of the manufacturing apparatus.

A first exemplary aspect is a method for manufacturing an automobile, including:
placing a body on a pre-assembled underside part set, and then
assembling the underside part set onto the body, in which
the underside part set includes a rear suspension in which a spring and a shock absorber are arranged side by side, and
the spring is brought into a compressed state in the underside part set before the body is placed on the underside part set.

In the method for manufacturing an automobile according to an embodiment of the present disclosure, the underside part set includes a rear suspension in which a spring and a shock absorber are arranged side by side, and the spring of the rear suspension is brought into a compressed state in the underside part set before the body is placed on the underside part set. Therefore, when the underside part set is assembled onto the body, it is unnecessary to compress the spring by pressing the body onto the underside part set. As a result, it is possible to prevent or reduce an increase in size of the manufacturing apparatus.

The body may be grasped, transported, and placed on the underside part set by a robot arm. It is possible to transport the body to an accurate position on the underside part set in a short time.

Further, a grasping part of the robot arm may be inserted into the body from openings for door panels provided on both sides of the body, and the body may be grasped by the grasping part and transported. It is possible to easily grasp the body.

A bottom of the body may be grasped by the grasping part. Since the bottom of the body, which is less likely to be deformed, is grasped, it is possible to prevent a deformation of the body, which would otherwise be caused during the transportation process.

A line through which the body onto which the underside part set has not assembled yet is conveyed may be located in a place higher than a place of a line in which the underside part set is assembled onto the body. The body can be transported with small energy.

A positioning pin for placing the body on the underside part set may be provided in the line in which the underside part set is assembled onto the body. The positioning pin may be automatically moved to a determined place according to a type of the body before the body is placed on the underside part set. It is possible to position the body in a short time even when the type of the body changes.

The positioning pin may include a first positioning pin disposed on a front side of the body and a second positioning pin disposed on a rear side of the body, and at least one of the first and second positioning pins may be automatically moved to the determined place according to the type of the body.

Another exemplary aspect is a compression holding jig configured to, before a rear suspension in which a spring and a shock absorber are arranged side by side is assembled onto a body, bring the spring into a compressed state, the compression holding jig including:
a threaded shaft configured to be inserted through a spring seat included in the rear suspension and the spring placed on the spring seat;
a conical upper pressing plate configured to be detachably engaged with an upper end of the threaded shaft; and
a lower pressing plate configured to be put on the threaded shaft from a lower end thereof and press the spring seat from an underside thereof, in which an opening is formed in a central part of the upper pressing plate, the opening being configured to be engaged with the upper end of the threaded shaft, and a part of the upper pressing plate is cut out so that the cut-out part has a fan shape extending from the opening, and the spring is compressed between the upper pressing plate and the spring seat by attaching the upper pressing plate at the middle of the spring and thereby engaging the upper pressing place with the threaded shaft, and screwing a nut on the threaded shaft from an underside of the lower pressing plate.

In the compression holding jig according to an aspect of the present disclosure, an opening is formed in a central part of the upper pressing plate, the opening being configured to be engaged with the upper end of the threaded shaft, and a part of the upper pressing plate is cut out so that the cut-out part has a fan shape extending from the opening, and the spring is compressed between the upper pressing plate and the spring seat by attaching the upper pressing plate at the middle of the spring and thereby engaging the upper pressing place with the threaded shaft, and screwing a nut on the threaded shaft from an underside of the lower pressing plate. Therefore, after the rear suspension is assembled onto the body, the upper pressing plate can be easily removed from the spring by loosening the nut. That is, it is possible to easily remove the compression holding jig from the spring.

According to the present disclosure, it is possible to provide a method for manufacturing an automobile, capable preventing or reducing an increase in size of the manufacturing apparatus.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will be described hereinafter in detail with reference to the drawings. However, the present disclosure is not limited to the below-shown embodiments. Further, the following descriptions and drawings are simplified as appropriate for clarifying the explanation.

First Embodiment

Figure 1:
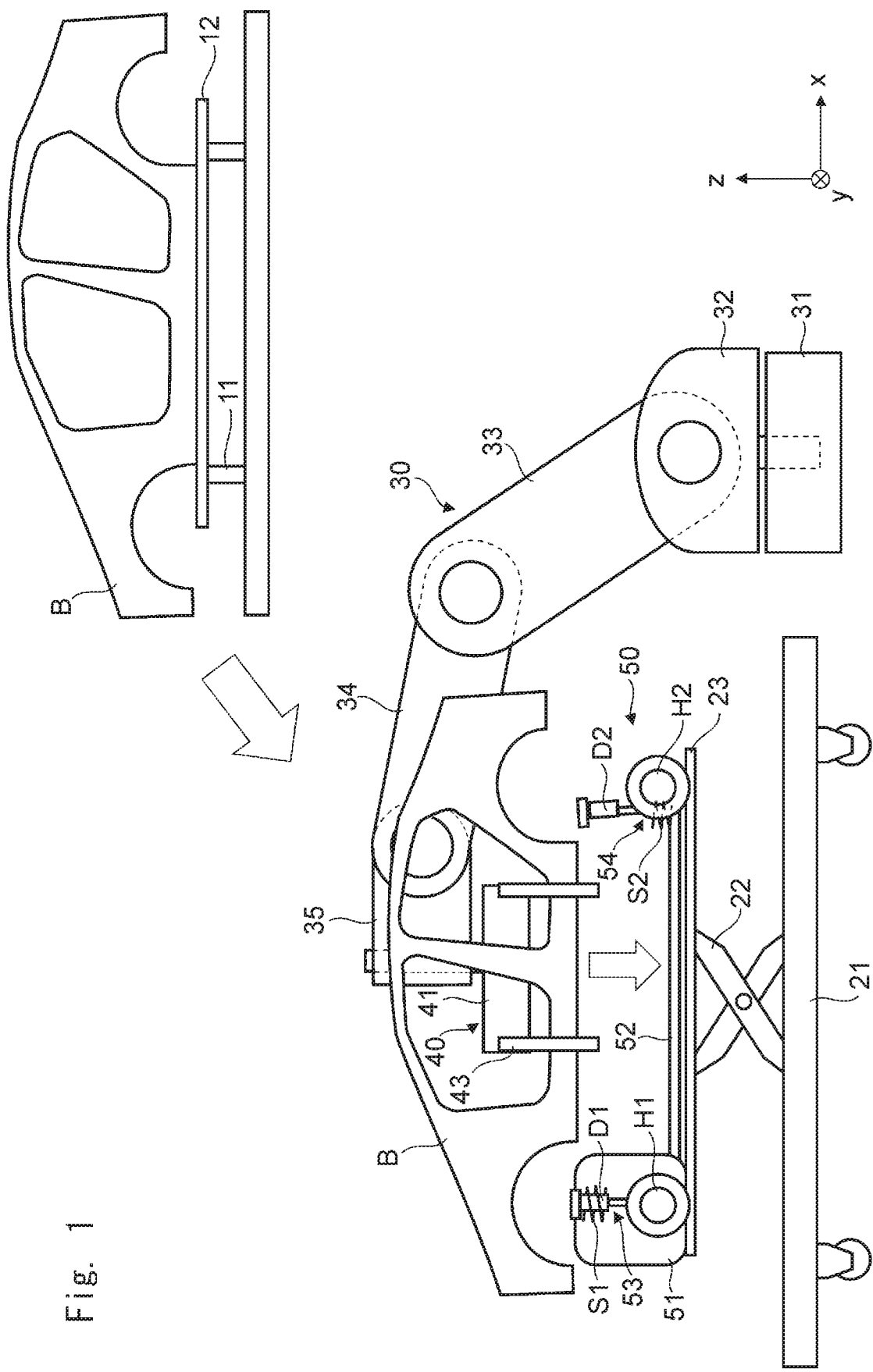
FIG. 1 is a schematic side view showing a method for manufacturing an automobile according to a first embodiment.

Firstly, a method for manufacturing an automobile according to a first embodiment is described with reference to FIG. 1. FIG. 1 is a schematic side view showing a method for manufacturing an automobile according to the first embodiment.

Further, needless to say, right-handed xyz orthogonal coordinate systems shown in FIG. 1 and other drawings are shown for the sake of convenience to explain positional relations among components. In general, a z-axis positive direction is a vertically upward direction and an xy-plane is a horizontal plane.

<Outline of Method for Manufacturing Automobile>

Firstly, an outline of a method for manufacturing an automobile according to the first embodiment is described.

As shown in FIG. 1, in the method for manufacturing an automobile according to the first embodiment, after a body B of an automobile is placed on a pre-assembled underside part set 50, the underside part set 50 is assembled (i.e., attached) onto the body B. Note that the underside part set 50 includes a rear suspension 54 in which a spring S2 and a shock absorber (also called a damper) D2 are arranged side by side. The spring S2 is brought into a compressed state in the underside part set 50 before the body B is placed on the underside part set 50.

As described above, in the method for manufacturing an automobile according to the first embodiment, the spring S2 is brought into a compressed state in the underside part set 50 before the body B is placed on the underside part set 50. Therefore, when the underside part set 50 is assembled onto the body B, it is unnecessary to compress the spring S2 by pressing the body B onto the underside part set 50. As a result, it is possible to prevent or reduce an increase in size of the manufacturing apparatus.

<Details of Method for Manufacturing Automobile>

Next, details of the method for manufacturing an automobile according to the first embodiment are described.

As shown in FIG. 1, the body B, onto which the underside part set 50 has not been assembled yet, is placed on a painting carriage 12 that travels on rails 11 extending in the y-axis direction and is conveyed, for example, in the y-axis positive direction from the front side of the drawing in FIG. 1. The line through which the body B, onto which the underside part set 50 has not been assembled yet, is conveyed is, for example, a painting line. That is, the underside part set 50 is assembled onto the painted body B.

In the example shown in FIG. 1, the underside part set 50 is placed on an assembling carriage 21 that travels in the x-axis negative direction. For example, the underside part set 50, which has been assembled on the y-axis positive direction side with respect to the assembling carriage 21, is conveyed in the y-axis negative direction and placed on the assembling carriage 21, which is in a standstill state. More specifically, the underside part set 50 is supported on a support frame 23 of the assembling carriage 21. Further, the support frame 23 is supported on a leg part 22 provided on the assembling carriage 21. The leg part 22 is composed of a pair of support columns, which are connected to each other in such a manner that they cross each other in an X-shape and can rotate with respect to each other. Therefore, the support frame 23 can be raised and lowered. Note that the support frame 23 may not be able to be raised and lowered.

In the example shown in FIG. 1, the underside part set 50 includes an engine 51, an exhaust pipe 52, a front suspension 53, and a rear suspension 54. That is, the automobile to be manufactured is an engine car (e.g., a car with an internal-combustion engine). The front suspension 53 includes springs S1 and shock absorbers D1, and is connected to front wheel hubs H1. Each shock absorber D1 and its respective spring S1 are integrated with each other by inserting the shock absorber D1 into the spring S1. The rear suspension 54 includes springs S2 and shock absorbers D2, and is connected to rear wheel hubs H2.

Note that before the body B is placed on the underside part set 50, e.g., before the underside part set 50 is assembled onto the body B, the springs S2 of the rear suspension 54 are brought into a compressed state.

Note that illustration of other underside parts included in the underside part set 50 is omitted in FIG. 1. Further, details of the configuration of the rear suspension 54 will be described later.

As shown in FIG. 1, by a grasping part 40 of a robot arm 30, the body B is grasped, transported from the painting line, and placed on the underside part set 50, which is supported on the supporting frame 23 of the assembling carriage 21. Note that the painting line including the rails 11 and the painting carriage 12 is located in a place higher than a place of an assembling line in which the underside part set 50 is assembled onto the body B. That is, since the body B is transported from the high place to the low place, the body B can be transported with small energy.

Details of the configuration of the robot arm 30 will be described later.

After that, the underside part set 50 is assembled onto the body B, which has been placed on the underside part set 50, from the underside of the body B by using screws or the like. For example, a plurality of underside parts are assembled onto the body B all at once by using a plurality of fastening robots (not shown) provided on both sides of the assembling carriage 21 in the width direction (i.e., the y-axis direction). Instead of using the plurality of fastening robots, a plurality of workers may simultaneously assemble the plurality of underside parts onto the body B. Compared to the case where underside parts are assembled onto the body one by one while conveying the body in a lifted state (e.g., while being suspended), the assembling time can be reduced. Further, there is no need to hold the body B in a lifted state (e.g., a suspended state) or a raised state when underside parts are assembled onto the body B. In addition, it is possible to eliminate the need for the line for assembling underside parts itself. In the example shown in FIG. 1, the body B, onto which the underside part set 50 has been assembled, is conveyed in the x-axis negative direction by the assembling carriage 21.

As described above, in the method for manufacturing an automobile according to the first embodiment, the springs S2 are brought into a compressed state in the underside part set 50 before the body B is placed on the underside part set 50. Therefore, when the underside part set 50 is assembled onto the body B, it is unnecessary to compress the springs S2 by pressing the body B onto the underside part set 50 by using, for example, the robot arm 30. As a result, it is possible to prevent or reduce the increase in size of the manufacturing apparatus such as the robot arm 30.

Note that automobiles to be manufactured are not limited to engine cars. That is, they may be electric cars, hybrid cars, or fuel-cell cars, or may include them in a mixed manner. Needless to say, underside parts included in the underside part set 50 change according to the type of the automobiles. However, in any case, the underside part set 50 includes the rear suspension 54 in which the spring S2 and the shock absorber D2 are arranged side by side.

<Configuration of Robot Arm 30>

Figure 2:
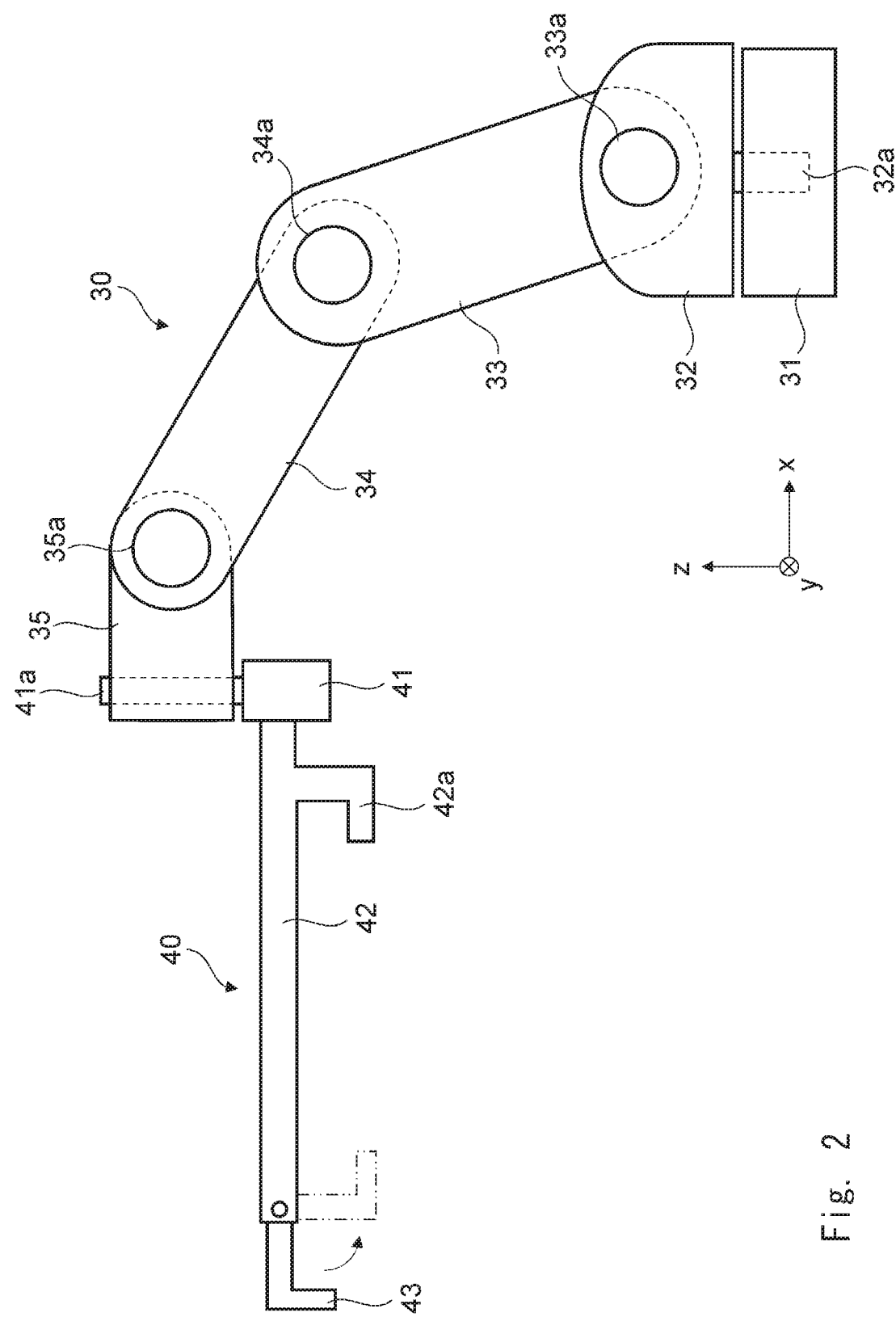
FIG. 2 is a schematic side view showing an example of a robot arm for transporting a body, used in a method for manufacturing an automobile according to the first embodiment.

Next, details of the robot arm 30 are described with reference to FIG. 2 as well as FIG. 1. FIG. 2 is a schematic side view showing an example of a robot arm for transporting a body, used in a method for manufacturing an automobile according to the first embodiment.

The robotic arm 30 is a body transport apparatus for transporting a body B. As shown in FIG. 2, the robot arm 30 is an articulated robot arm including a base part 31, a link base part 32, a first link 33, a second link 34, a third link 35, and a grasping part 40.

The link base part 32 is connected to the base part 31 through a rotation shaft 32a in such a manner that the link base part 32 can rotate around the rotation shaft 32a. The rotation shaft 32a of the link base part 32 is a shaft parallel to the z-axis. The link base part 32 is rotationally driven by a motor or the like (not shown).

The first link 33 is rotatably connected to the link base part 32 through a first joint part 33a provided at the rear end of the first link 33. Further, the second link 34 is rotatably connected to the front end of the first link 33 through a second joint part 34a provided at the rear end of the second link 34. Note that the rotation shafts of the first and second joint parts 33a and 34a are shafts parallel to the y-axis in the state shown in FIGS. 1 and 2. The height of the grasping part 40 can be changed by rotating the first and second links 33 and 34. The first and second links 33 and 34 are rotationally driven by respective motors or the like (not shown).

The third link 35 is rotatably connected to the front end of the second link 34 through a third joint part 35a provided at the rear end of the third link 35. Note that the rotation shaft of the third joint part 35a is a shaft parallel to the y-axis in the state shown in FIGS. 1 and 2. The grasping part 40 is rotatably connected to the front end of the third link 35 through a rotation shaft 41a. When the body B is transported, the grasping part 40 grasping the body B is maintained substantially horizontal, so that the third link 35 is also maintained substantially horizontal. The third link 35 is rotationally driven by a motor or the like (not shown).

The grasping part 40 includes a base part 41, a fork 42, and a front hook 43. Note that FIG. 2 shows a side view of the grasping part 40 and FIG. 1 shows a front view of the grasping part 40 grasping the body B. As shown in FIGS. 1 and 2, the rotation shaft 41a, which extends in the vertical direction (the z-axis direction), is disposed at the center of the upper surface of the base part 41, and the grasping part 40 can rotate around the rotation shaft 41a. The grasping part 40 is rotationally driven by a motor or the like (not shown).

As shown in FIGS. 1 and 2, two prongs of the fork 42 extend from the base part 41 in parallel to each other in a substantially horizontal direction. Further, an L-shaped front hook 43 is rotatably connected to the front end of each of the two prongs of the fork 42. Further, as shown in FIG. 2, an L-shaped rear hook 42a is provided in a part of the fork 42 close to the base part 41. The front hooks 43 are rotationally driven by a motor(s) or the like (not shown).

When the grasping part 40 grasps the body B, the front hooks 43 rotate downward from a state indicated by solid lines in FIG. 2 to a state indicated by chain double-dashed lines in FIG. 2. Specifically, as shown in FIG. 1, for example, after the prongs of the fork 42 are inserted from openings for door panels provided on both side surfaces of the body B, the bottom of the body B is grasped by the downwardly rotated front hooks 43 and the rear hook 42a.

Since the prongs of the fork 42 are inserted from the openings for the door panels, the body B can be easily grasped. Further, since the bottom of the body B, which is less likely to be deformed, is grasped, it is possible to prevent a deformation of the body B, which would otherwise be caused during the transportation process.

Note that the grasping part 40 may be configured so that it can be tilted (or rotated) around the longitudinal axis of the fork 42 (i.e., around the axis in the x-axis direction in FIG. 2).

Note that the transport apparatus for transporting the body B is not limited to the robot arm. That is, the transport apparatus may be a hanger, a forklift, or other types of transport apparatuses. However, by grasping and transporting the body B by using the robot arm 30, the body B can be transported to an accurate position on the underside part set 50 in a short time.

<Configuration of Rear Suspension 54>

Figure 3:
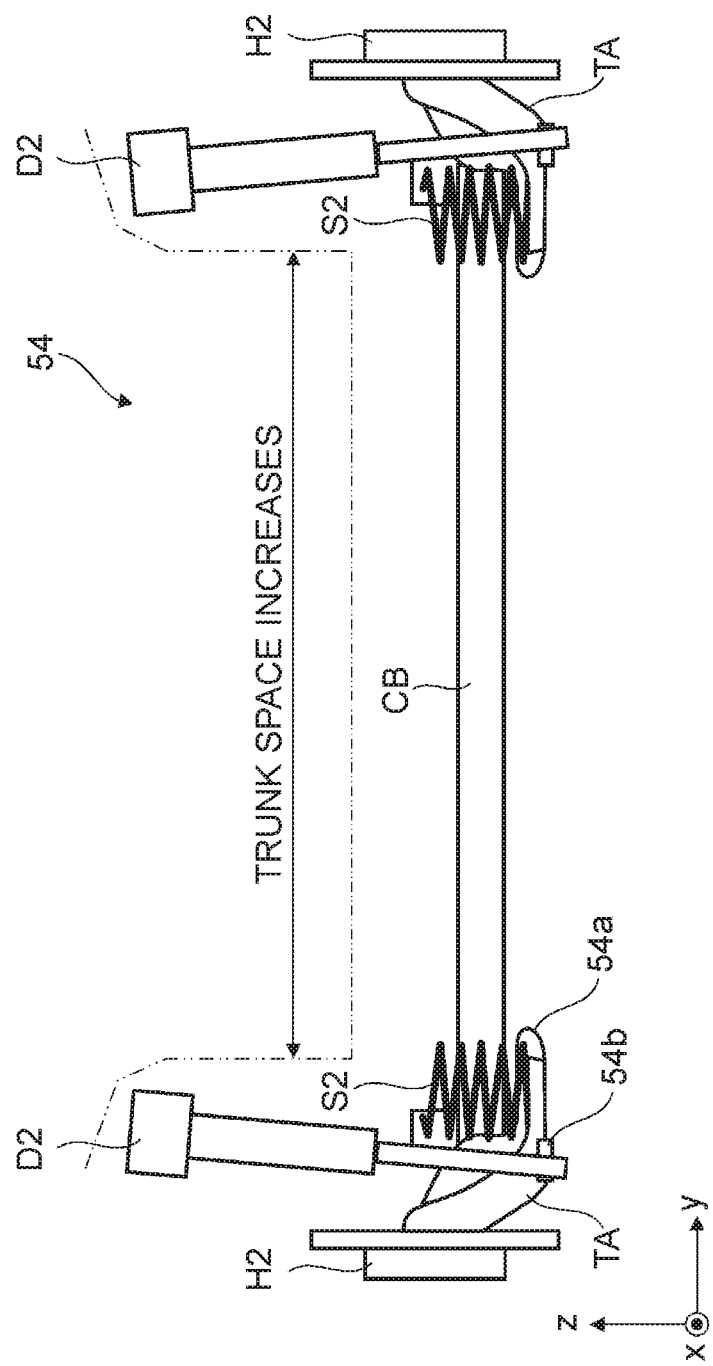
FIG. 3 is a rear view of an example of a rear suspension 54.

Next, a configuration of an example of the rear suspension 54 included in the underside part set 50 is described with reference to FIG. 3. FIG. 3 is a rear view of an example of the rear suspension 54. The rear suspension 54 shown in FIG. 3 is a torsion beam type suspension including a pair of springs S2, a pair of shock absorbers D2, a pair of trailing arms TA, and a cross beam (also referred to as a torsion beam) CB.

As shown in FIG. 3, in the rear suspension 54, a spring S2 and a shock absorber D2 are arranged side by side on either side, i.e., on each of the left and right sides. Specifically, the springs S2 are placed on respective dish-like spring seats 54a provided in respective trailing arms TA. Note that in the underside part set 50, each of the springs S2 is fixed to the respective spring seat 54a in a compressed state. The shock absorbers D2 are rotatably supported on respective pin-like brackets 54b provided in respective trailing arms TA.

As described above, the springs S2 and the shock absorbers D2 are separately connected to the respective trailing arms TA, and connected to respective rear wheel hubs H2 through the trailing arms TA. Further, the left and right trailing arms TA are connected to each other by the cross beam CB extending in the left-right direction (in the y-axis direction).

Since the springs S2 and the respective shock absorbers D2 are arranged side by side, the volume of a trunk space indicated by chain double-dashed lines in FIG. 3 can be increased as compared to the case where the springs and the respective shock absorbers are integrated with each other. Theoretically, it is possible to increase the width of the trunk space by a length equivalent to twice the difference between the outer diameter of the spring and the outer diameter of the shock absorber in total in the left and right sides.

Note that the rear suspension 54 is not limited to the torsion beam type as long as the spring S2 and the shock absorber D2 are arranged side by side. That is, the rear suspension 54 may be a multi-link type, a double wishbone type, or other types of suspensions.

<Method for Compressing Spring S2>

Figure 4:
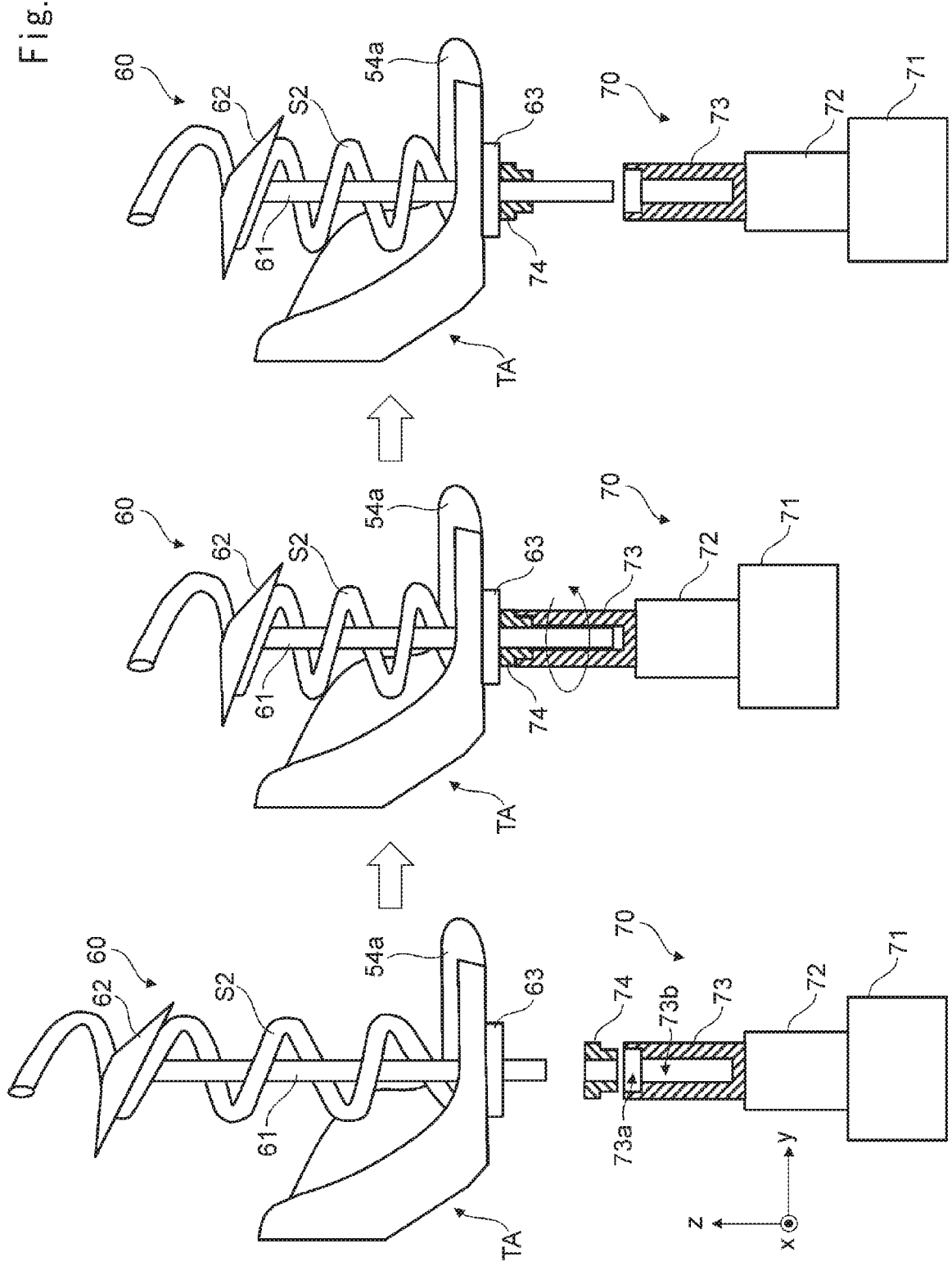
FIG. 4 is a schematic side view showing a method for compressing a spring S2.

Next, a method for compressing the spring S2 is described with reference to FIG. 4. FIG. 4 is a schematic side view showing a method for compressing the spring S2. As shown in FIG. 4, by using a compression holding jig 60 and a compression device 70, the spring S2 placed on the spring seat 54a of the trailing arm TA is fixed to the spring seat 54a while being compressed. The compression holding jig 60 includes a threaded shaft 61, an upper pressing plate 62, and a lower pressing plate 63. The compression device 70 includes a drive source 71, a speed reducer 72, a socket 73, and a nut 74. For the sake of easier understanding, the socket 73 and the nut 74 are shown in cross section in FIG. 4.

As shown on the left side of FIG. 4, the threaded shaft 61 is inserted through the spring seat 54a and the spring S2 placed on the spring seat 54a. A through hole through which the threaded shaft 61 is inserted is provided in the spring seat 54a. Then, the umbrella-shaped (conical) upper pressing plate 62 is engaged with the upper end of the threaded shaft 61. Meanwhile, the lower pressing plate 63 is put on the threaded shaft 61 from the lower end thereof and is made to abut against the underside of the spring seat 54a. The lower pressing plate 63 is, for example, a large flat washer.

Figure 5:
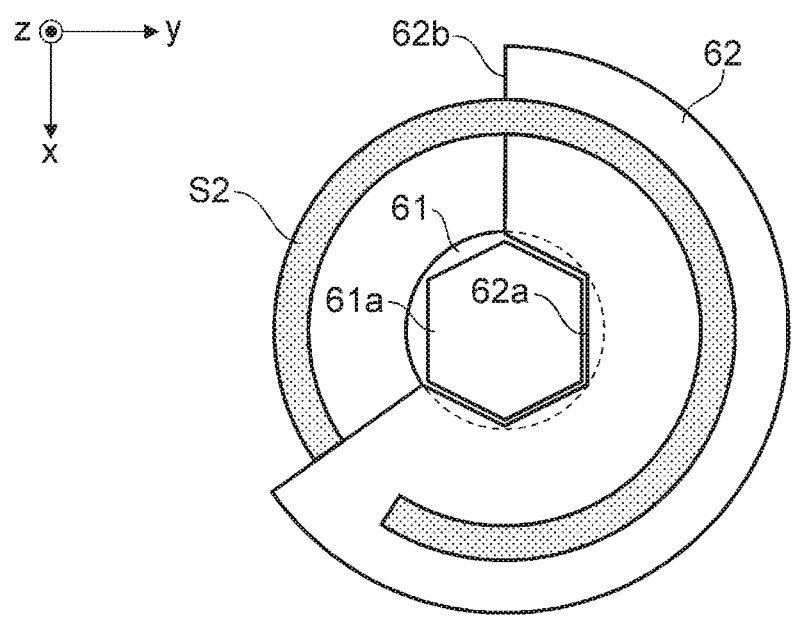
FIG. 5 is a plan view showing a positional relation among the spring S2, a threaded shaft 61, and an upper pressing plate 62.

Here, FIG. 5 is a plan view showing a positional relation among the spring S2, the threaded shaft 61, and the upper pressing plate 62. For the sake of easier understanding, the spring S2 is indicated by a dotted line. As shown in FIG. 5, the upper end 61a of the threaded shaft 61 is processed (e.g., machined) into a hexagonal shape.

As shown in FIG. 5, an opening 62a that engages with the hexagonal upper end 61a of the threaded shaft 61 is formed at the center of the upper pressing plate 62. Further, the upper pressing plate 62 is not a perfect circle in a plan view, but includes a fan-shaped cut-out part 62b having a central angle of about 120°. That is, a part of the umbrella-shaped upper pressing plate 62 is cut out so that the cut-out part has a fan shape extending from the opening 62a. Therefore, it is possible to mount the upper pressing plate 62 at the middle of the spring S2, rather than on the upper end of the spring S2.

As shown on the left side of FIG. 4, the nut 74 is engaged in an engagement hole 73a provided on the upper end of the socket 73. Then, as shown in the central part of FIG. 4, the socket 73 is rotationally driven by the drive source 71 such as a motor, connected through the speed reducer 72 such as a gear. The nut 74 engaged in the socket 73 is screwed and tightened on the threaded shaft 61. In this way, the threaded shaft 61 moves in the downward direction (in the z-axis negative direction) and hence the spring S2 is compressed between the upper pressing plate 62 and the spring seat 54a. As a result, the threaded shaft 61 projecting from the lower end of the nut 74 extends (i.e., advances) downward and is housed in a vertical hole 73b formed inside the socket 73.

As shown in the right side of FIG. 4, after the compression of the spring S2 is completed, the nut 74 is removed from the socket 73. The compressed state of the spring S2 can be maintained by the compression holding jig 60 and the nut 74. That is, in the state where the compression holding jig 60 and the nut 74 are attached to the spring S2, the spring S2 is assembled onto the body B as a part of the underside part set 50.

Note that in FIG. 3, illustration of the compression holding jig 60 for holding the spring S2 in the compressed state and the like is omitted.

After the assembling, the upper pressing plate 62 can be easily removed from the spring S2 by removing the nut 74 from the threaded shaft 61. That is, it is possible to easily remove the compression holding jig 60 from the spring S2. It should be noted that if the upper pressing plate 62 is mounted on the upper end of the spring S2, it becomes lodged between the spring S2 and the body B and hence cannot be removed from the spring S2. Therefore, the upper pressing plate 62 is mounted at the middle (i.e., at a part other than the ends) of the spring S2, rather than on the upper end of the spring S2. Note that the closer the spring S2 is mounted to the upper end of the upper pressing plate 62, the more efficiently the spring S2 can be compressed.

Second Embodiment

Figure 6:
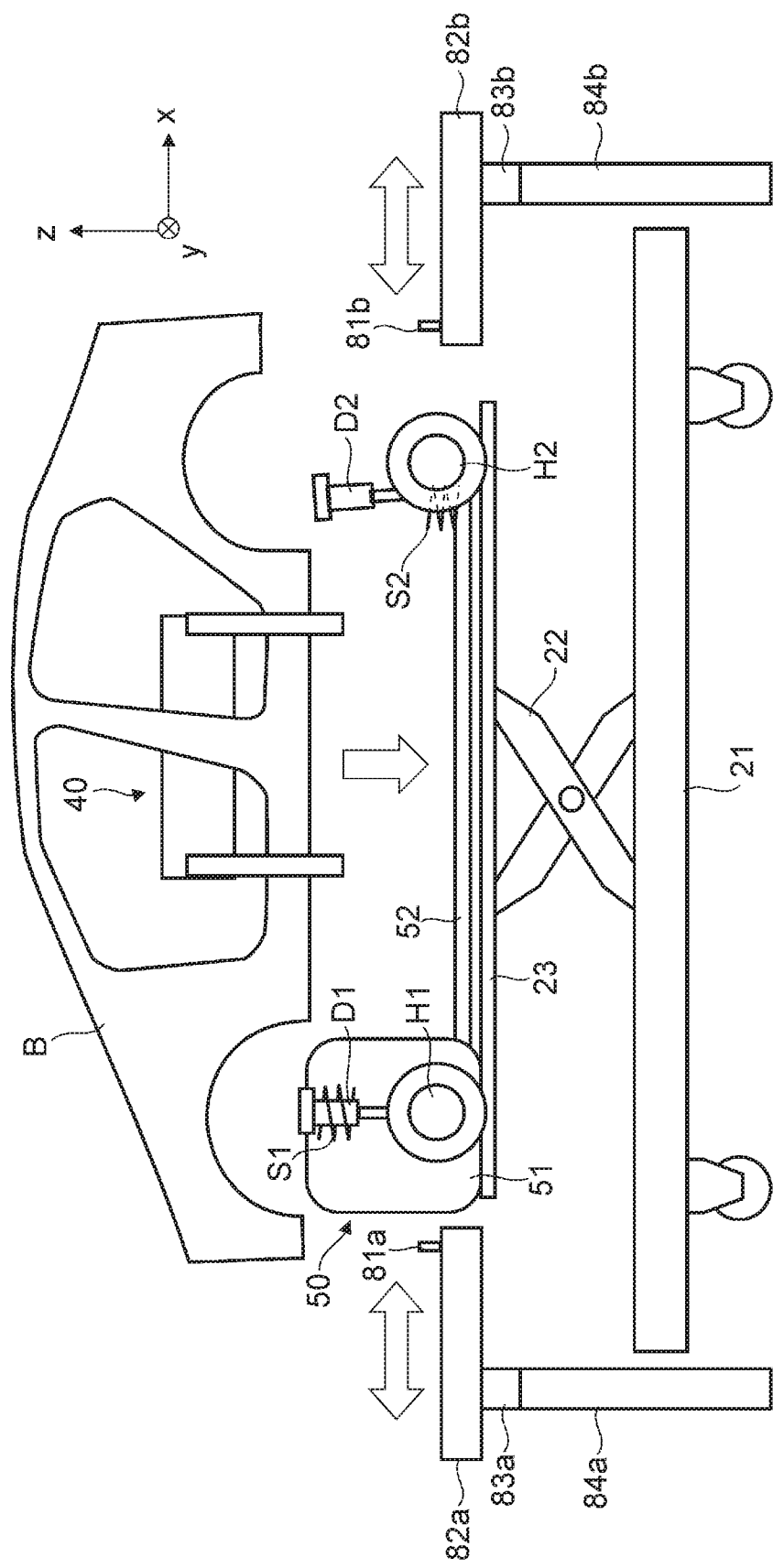
FIG. 6 is a schematic side view showing a method for manufacturing an automobile according to a second embodiment.
Figure 7:
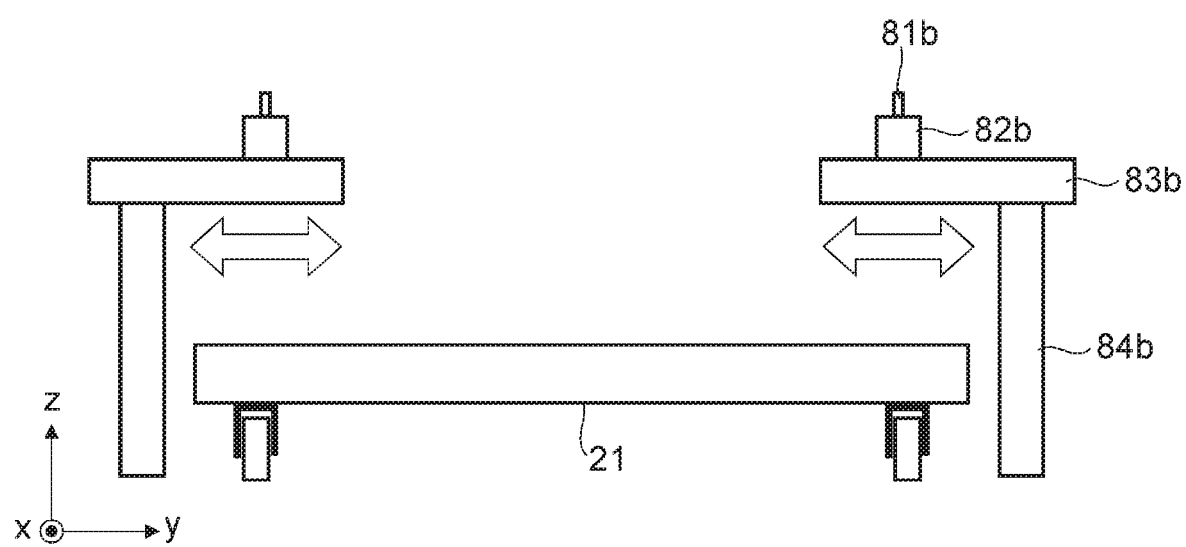
FIG. 7 is a schematic rear view showing a positional relation between an assembling carriage 21 and a rear-side positioning pin 81b.

Next, details of a method for manufacturing an automobile according to a second embodiment are described with reference to FIGS. 6 and 7. FIG. 6 is a schematic side view showing the method for manufacturing an automobile according to the second embodiment. FIG. 7 is a schematic rear view showing a positional relation between an assembling carriage 21 and a rear-side positioning pin 81b.

As shown in FIGS. 6 and 7, in the method for manufacturing an automobile according to the second embodiment, positioning pins 81a and 81b for placing a body B on a underside part set 50 are provided in an assembling line in which the underside part set 50 is assembled onto the body B. Note that the positioning pins 81a (a first positioning pin) is provided on the front side of the body B and the positioning pin 81b (a second positioning pin) is provided on the rear side of the body B. Further, the positioning pins 81a and 81b are automatically moved to positions that are determined according to the type of the body B. Therefore, in the method for manufacturing an automobile according to the second embodiment, it is possible to assemble a plurality of types of underside part sets 50 onto corresponding types of bodies B in one assembling line.

Note that only one of the positioning pins 81a and 81b may be configured to be automatically moved to a position that is determined according to the type of the body B.

As shown in FIG. 7, each of a pair of positioning pins 81b is disposed on a respective one of support columns 84b that are arranged side by side in the vehicle width direction (in the y-axis direction) with a assembling carriage 21 interposed therebetween. More specifically, each of the pair of positioning pins 81b is disposed on the upper surface of a respective one of sliders 82b extending in the vehicle longitudinal direction (hereinafter also referred to as vehicle longitudinal direction sliders 82b). As shown in FIG. 6, the vehicle longitudinal direction sliders 82b are mounted on the upper surfaces of sliders 83b extending in the vehicle width direction (hereinafter also referred to as vehicle width direction sliders 83b) so that they can slide in the vehicle longitudinal direction (in the x axis direction). As shown in FIG. 7, the vehicle width direction sliders 83b are mounted on the upper surfaces of the support columns 84b so that they can slide in the vehicle width direction (in the y axis direction).

Therefore, the positioning pins 81b can be freely moved on the xy-plane in the movable ranges of the vehicle longitudinal direction slider 82b and the vehicle width direction slider 83b. By the above-described configuration, the positioning pins 81b are automatically moved to the positions determined according to the type of the body B. Therefore, it is possible to position the positioning pins 81b in a short time even when the type of the body B changes.

As shown in FIG. 6, similarly to the positioning pin 81b on the rear side, the positioning pin 81a on the front side is disposed on the support column 84a with a vehicle longitudinal direction slider 82a and a vehicle width direction slider 83a interposed therebetween. The configuration and operation of the positioning pin 81a on the front side are similar to those of the positioning pin 81b on the rear side, and therefore detailed descriptions thereof are omitted.

Note that the positioning pins 81a and 81b may be configured so that they can also be moved in the vehicle height direction (the z axis direction). Further, the positioning pins 81a and 81b may be movable in at least one direction, i.e., do not necessarily have to be movable in two or more directions.

The rest of the configuration is similar to that of the method for manufacturing an automobile according to the first embodiment, and therefore detailed descriptions thereof are omitted.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for manufacturing an automobile, comprising:
    placing a body on a pre-assembled underside part set, and then
    assembling the underside part set onto the body, wherein the underside part set includes a rear suspension in which a spring and a shock absorber are arranged side by side, and
    the spring is brought into a compressed state in the underside part set before the body is placed on the underside part set.

2. The method for manufacturing an automobile according to claim 1, wherein the body is grasped, transported, and placed on the underside part set by a robot arm.

3. The method for manufacturing an automobile according to claim 2, wherein a grasping part of the robot arm is inserted into the body from openings for door panels provided on both sides of the body, and the body is grasped by the grasping part and transported.

4. The method for manufacturing an automobile according to claim 3, wherein a bottom of the body is grasped by the grasping part.

5. The method for manufacturing an automobile according to claim 2, wherein a line through which the body onto which the underside part set has not been assembled yet is conveyed is located in a place higher than a place of a line in which the underside part set is assembled onto the body.

6. The method for manufacturing an automobile according to claim 1, wherein
    a positioning pin for placing the body on the underside part set is provided in the line in which the underside part set is assembled onto the body, and
    the positioning pin is automatically moved to a determined place according to a type of the body before the body is placed on the underside part set.

7. The method for manufacturing an automobile according to claim 6, wherein
    the positioning pin includes a first positioning pin disposed on a front side of the body and a second positioning pin disposed on a rear side of the body, and
    at least one of the first and second positioning pins is automatically moved to the determined place according to the type of the body.

* * * * *